(12) United States Patent
Zhuang et al.

(10) Patent No.: US 9,559,806 B2
(45) Date of Patent: Jan. 31, 2017

(54) POWER AMPLIFIER PROTECTION USING A CYCLIC REDUNDANCY CHECK ON THE DIGITAL TRANSPORT OF DATA

(71) Applicant: DALI SYSTEMS CO. LTD., George Town, Grand Cayman (KY)

(72) Inventors: Qianqi Zhuang, Richmond (CA); Shawn Patrick Stapleton, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 13 days.

(21) Appl. No.: 14/095,706

(22) Filed: Dec. 3, 2013

(65) Prior Publication Data
US 2014/0223266 A1    Aug. 7, 2014

Related U.S. Application Data

(60) Provisional application No. 61/733,324, filed on Dec. 4, 2012.

(51) Int. Cl.
- H03M 13/00 (2006.01)
- H04L 1/00 (2006.01)
- H04B 7/02 (2006.01)

(52) U.S. Cl.
CPC ............. H04L 1/0011 (2013.01); H04B 7/022 (2013.01); H04L 1/0045 (2013.01); H04L 1/0061 (2013.01)

(58) Field of Classification Search
CPC .... H04L 1/0011; H04L 1/0045; H04L 1/0061; H04B 7/022
See application file for complete search history.

(56) References Cited

U.S. PATENT DOCUMENTS

| | | | |
|---|---|---|---|
| 2006/0133380 A1* | 6/2006 | Meidan | H04L 1/0083 370/394 |
| 2007/0049990 A1* | 3/2007 | Klostermann et al. | 607/60 |
| 2007/0234134 A1* | 10/2007 | Shao | H04L 1/0061 714/701 |
| 2010/0208777 A1* | 8/2010 | Ogaz | 375/219 |
| 2012/0045211 A1* | 2/2012 | Tan et al. | 398/66 |
| 2013/0083768 A1* | 4/2013 | Liu et al. | 370/330 |

* cited by examiner

*Primary Examiner* — Sam Rizk
(74) *Attorney, Agent, or Firm* — Kilpatrick Townsend & Stockton LLP

(57) ABSTRACT

A method of conditioning payload data includes providing a processor and receiving a packet comprising payload data, a first error code, and a second error code. The method also includes computing, using the processor, a first recalculated error code and determining a difference between the first error code and the first recalculated error code. The method further includes modifying the payload data in response to determining the difference.

17 Claims, 6 Drawing Sheets

Data Frame Structure

| SYNC 401 | Vendor Specific Information 402 | C & M 403 | Payload I & Q 404 | CRC16 H 405 | CRC16 L 406 |

Cyclic Redundancy Coding Payload Data ical data. Any discrepancy
POWER AMPLIFIER PROTECTION USING A CYCLIC REDUNDANCY CHECK ON THE DIGITAL TRANSPORT OF DATA

CROSS-REFERENCES TO RELATED APPLICATIONS

This application claims priority to U.S. Provisional Patent Application No. 61/733,324, filed on Dec. 4, 2012, the disclosure of which is hereby incorporated by reference in its entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is maximizing the capacity of their DAS networks while ensuring cost-effective DAS deployments and at the same time providing a very high degree of DAS remote unit availability.

Despite the progress made in DAS networks, there is a need in the art for improved methods and systems related to DAS networks.

SUMMARY OF THE INVENTION

The present invention generally relates to communication systems using complex modulation techniques. More specially, the present invention relates to power amplifier systems that contain a microprocessor or other digital components, such as a Field Programmable Gate Array (FPGA) or Application Specific Integrated Circuit (ASIC). Power amplifiers are very sensitive to rapid changes in the signals passing through them. Unplugging the communications media (Fiber Optic Cable, Ethernet, Microwave Link, etc.) or abruptly cutting the cable can create unwanted spikes in the complex signals. These spikes can be delivered to the power amplifier and subsequently damage the internal devices. Embodiments of the present invention provide an efficient and effective method of protecting power amplifiers in a remote unit to which data has been transported over a digital link from a host unit to the remote unit.

Embodiments of the present invention provide systems and techniques that are based on performing a Cyclic Redundancy Check (CRC) on the transmitted data at the Host unit and then again on the received data at the remote unit, which contains the power amplifier. Any discrepancy between the two CRC codes will imply that the data has been corrupted with errors.

As described herein, embodiments of the present invention provide protection for power amplifiers utilized in transmission systems. By modifying payload data (e.g., reducing the amplitude of I/Q payload data) in response to the detection of errors or corruption of the payload data, embodiments of the present invention provide protection for power amplifiers not available using conventional techniques.

The present invention is applicable to any communication system with a power amplifier. A communication link can be established between a local host unit and a remote unit that contains a power amplifier. A Field Programmable Gate Array (FPGA) or Application Specific Integrated Circuit (ASIC) that incorporates a processor, such as a Power PC or Microblaze, controls the data flow to and from the Remote Unit.

DETAILED DESCRIPTION OF SPECIFIC EMBODIMENTS

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs.

Figure 1:
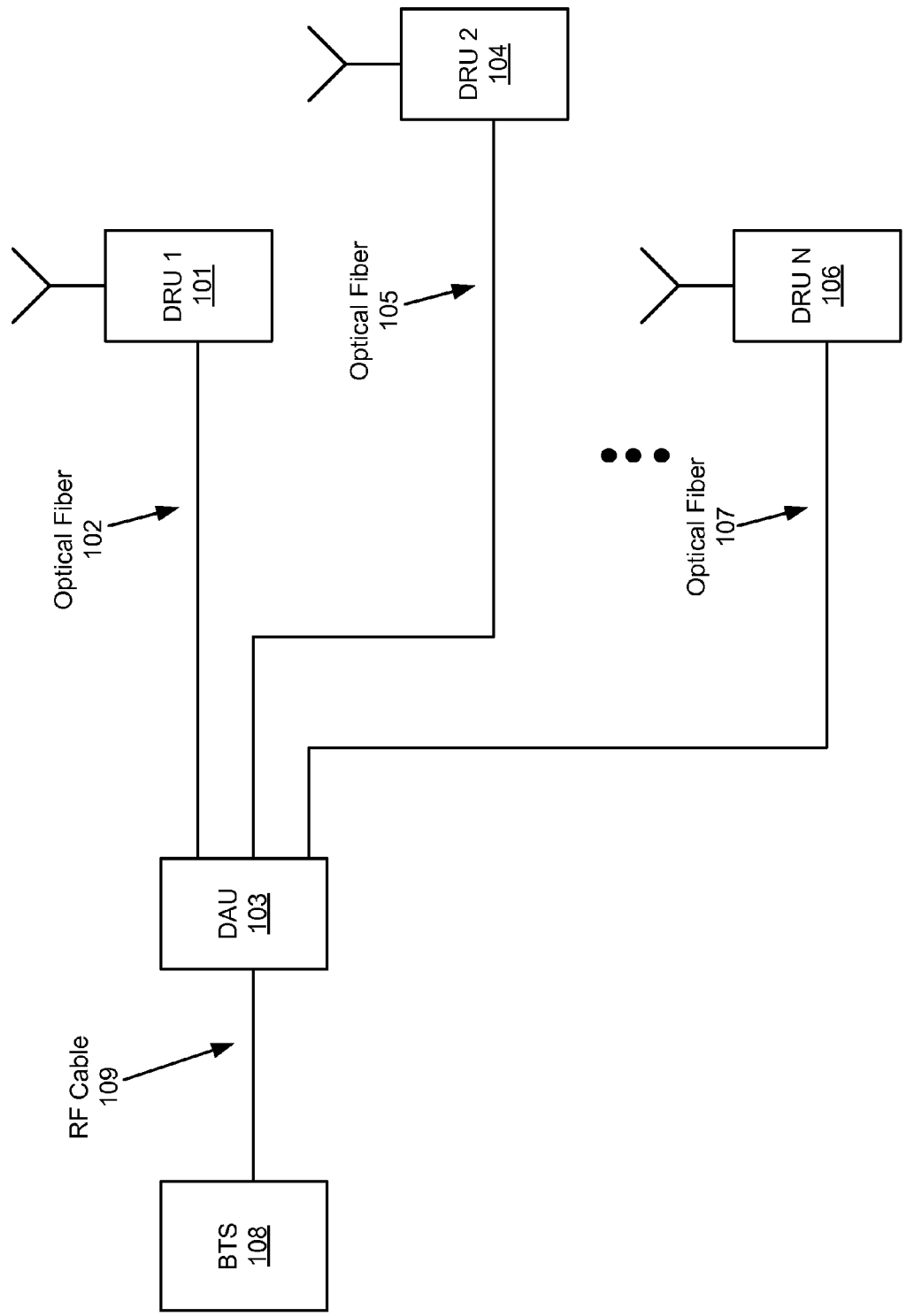
FIG. 1 is a block diagram showing a Distributed Antenna System (DAS), which includes one or more Digital Access Units (DAUs) and one or more Digital Remote Units (DRUs).

An embodiment shown in FIG. 1 illustrates a basic DAS network architecture according to an embodiment of the present invention and provides an example of a data transport scenario between a Base Station and multiple DRUs. In this embodiment, the DRUs are connected to the DAU in a star configuration to achieve coverage in a specific geographical area.

FIG. 1 is a block diagram of one embodiment of a Distributed Antenna System which includes one or more Digital Access Units 103 and one or more Digital Remote Units 101. The DAUs interface to one of more Base Transceiver Stations (BTS) 108. Up to N DRUs can be utilized in conjunction with a DAU. Additional description related to DAS architectures is provided in U.S. patent application Ser. No. 13/211,243, filed on Aug. 16, 2011, now U.S. Pat. No. 8,682,338, issued on Mar. 25, 2014, the disclosure of which is hereby incorporated by reference in its entirety for all purposes.

Figure 2:
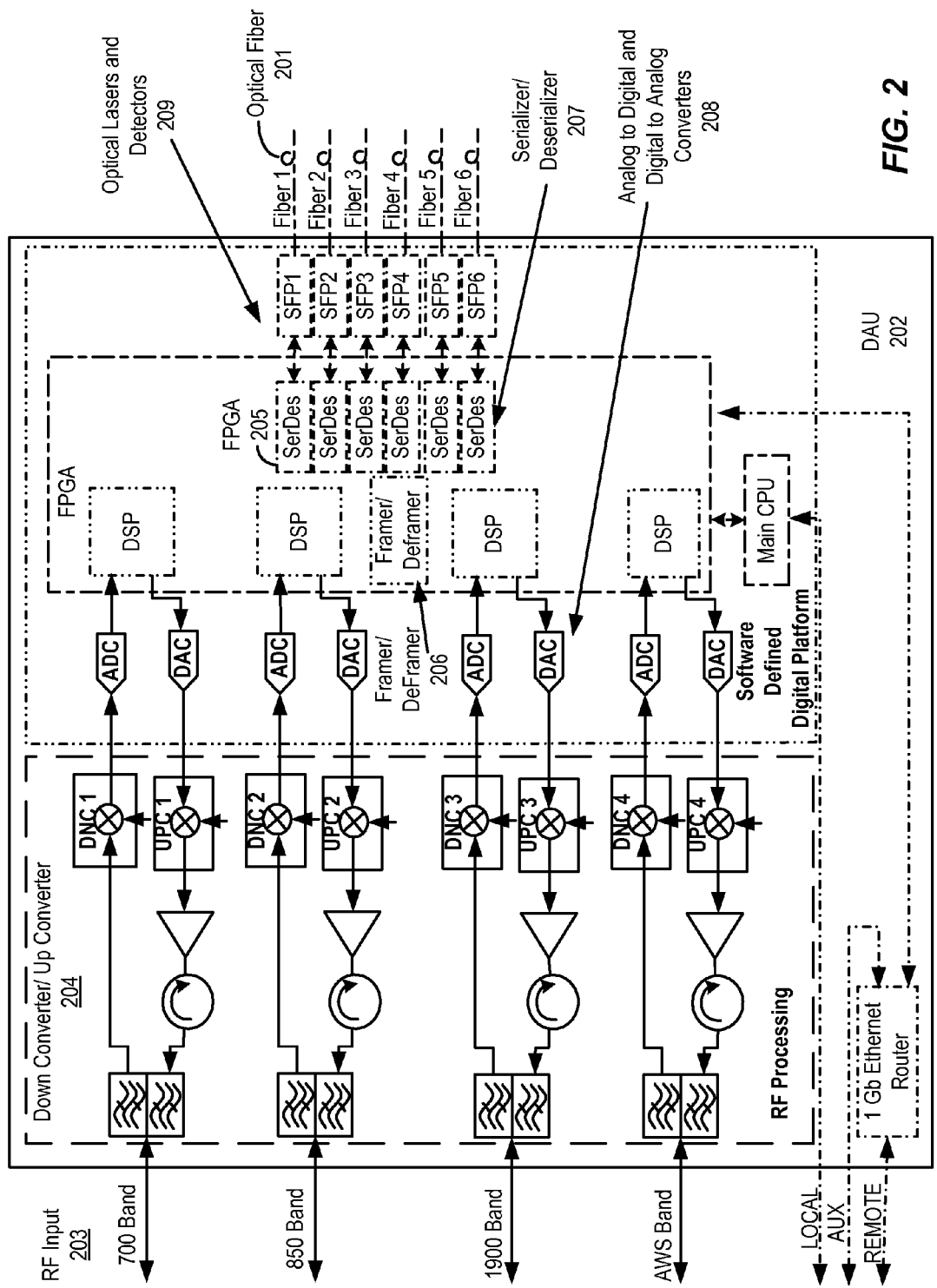
FIG. 2 is a block diagram of a Digital Access Unit (DAU).

FIG. 2 is a block diagram showing a DAU system for base-station applications according to one embodiment of the present invention. The DAU system for the base-station applications has RF input and output signals 203 and optical input and output signals 201. The DAU system includes four key parts; a FPGA-based digital part 205, a down converter and up-converter part 204, analog to digital and digital to analog converter part 208, and a optical laser and detector part 209. The FPGA-based digital part 205 includes a field programmable gate array (FPGA), digital signal processing (DSP) units, Framers/De-Framers, and Serializers/De-Serializers. Additional description related to DAUs is provided in U.S. patent application Ser. No. 12/767,669, filed on May 26, 2010, now U.S. Pat. No. 9,026,067, issued on May 5, 2015, Ser. No. 13/211,236, filed on Aug. 16, 2011, now U.S. Pat. No. 8,848,766, issued on Sep. 30, 2014, and Ser. No. 13/211,247, filed on Aug. 16, 2011, now U.S. Pat. No. 8,737,300, issued on May 27, 2014, all of which are hereby incorporated by reference in their entirety for all purposes.

Figure 3:
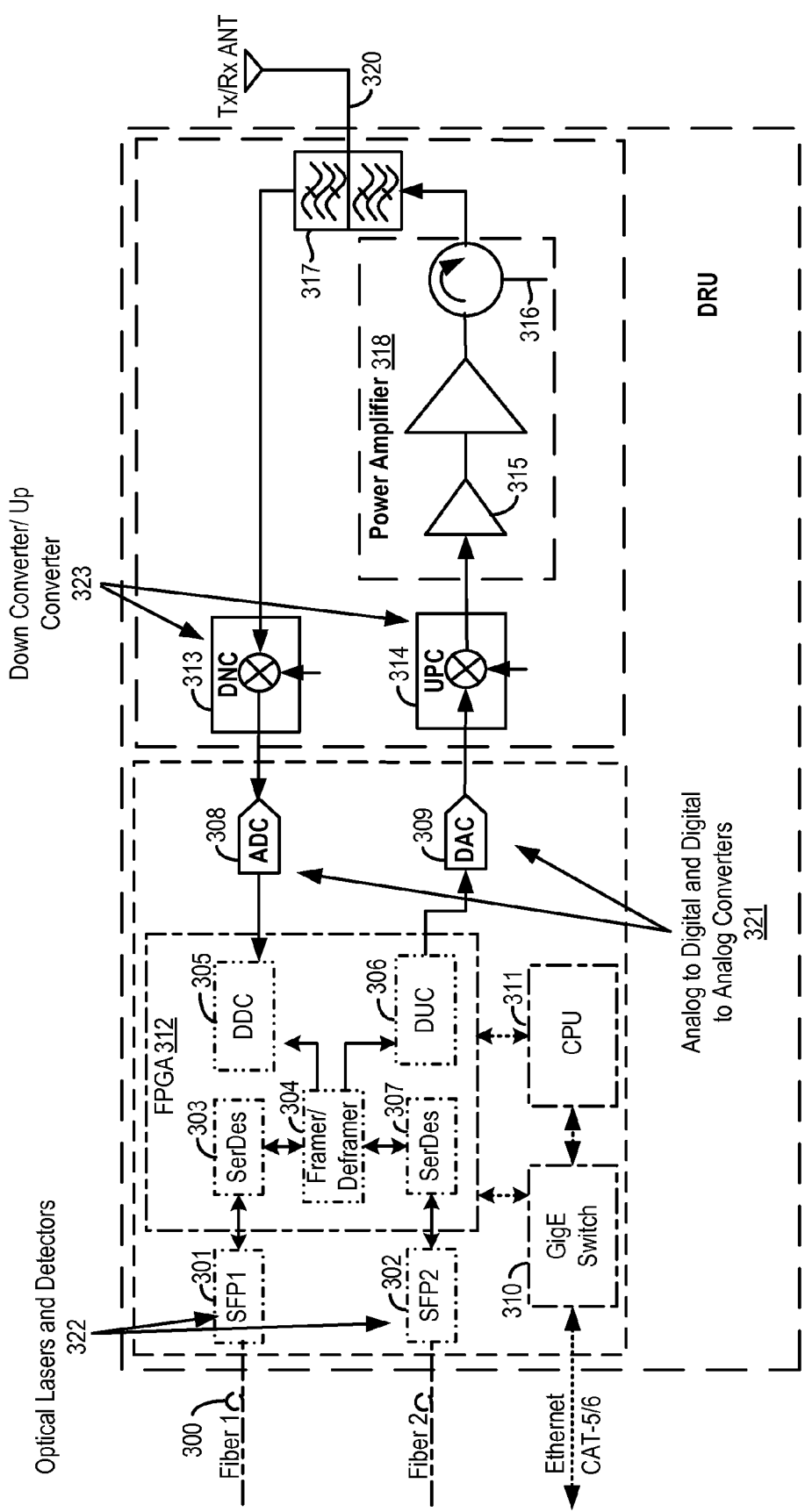
FIG. 3 is a block diagram of a Digital Remote Unit (DRU).

FIG. 3 is a block diagram showing a Digital Remote Unit (DRU) system according to one embodiment of the present invention. The DRU system has bidirectional optical signals 300 communicating with the DAU and bidirectional RF signals 320 transmitted and received by the RF antenna. The DRU system includes four key parts; a FPGA-based digital part 312, a down converter 313 and an up-converter 314 (the group labeled as 323), analog to digital (308) and digital to analog converter (309) (the group labeled as 321), an optical laser and detector part 322, and a power amplifier part 318. Additional description related to DRUs is provided in U.S. patent application Ser. No. 12/928,943, filed on Dec. 21, 2010, now U.S. Pat. No. 8,542,768, issued on Sep. 24, 2013, the disclosure of which is hereby incorporated by reference in its entirety for all purposes. Embodiments of the present invention provide methods and systems for protecting the power amplifier 318 from uncontrolled variations in signal.

As illustrated in FIG. 3, a fiber 300 is optically coupled to the DRU at SFP1 301. If the fiber is unplugged or the fiber line cut, then data that is being delivered from the DAU to the DRU will be corrupted, potentially resulting in large signal swings that are delivered to the power amplifier. Such large signal swings could damage the power amplifier.

Figures 4, 5:
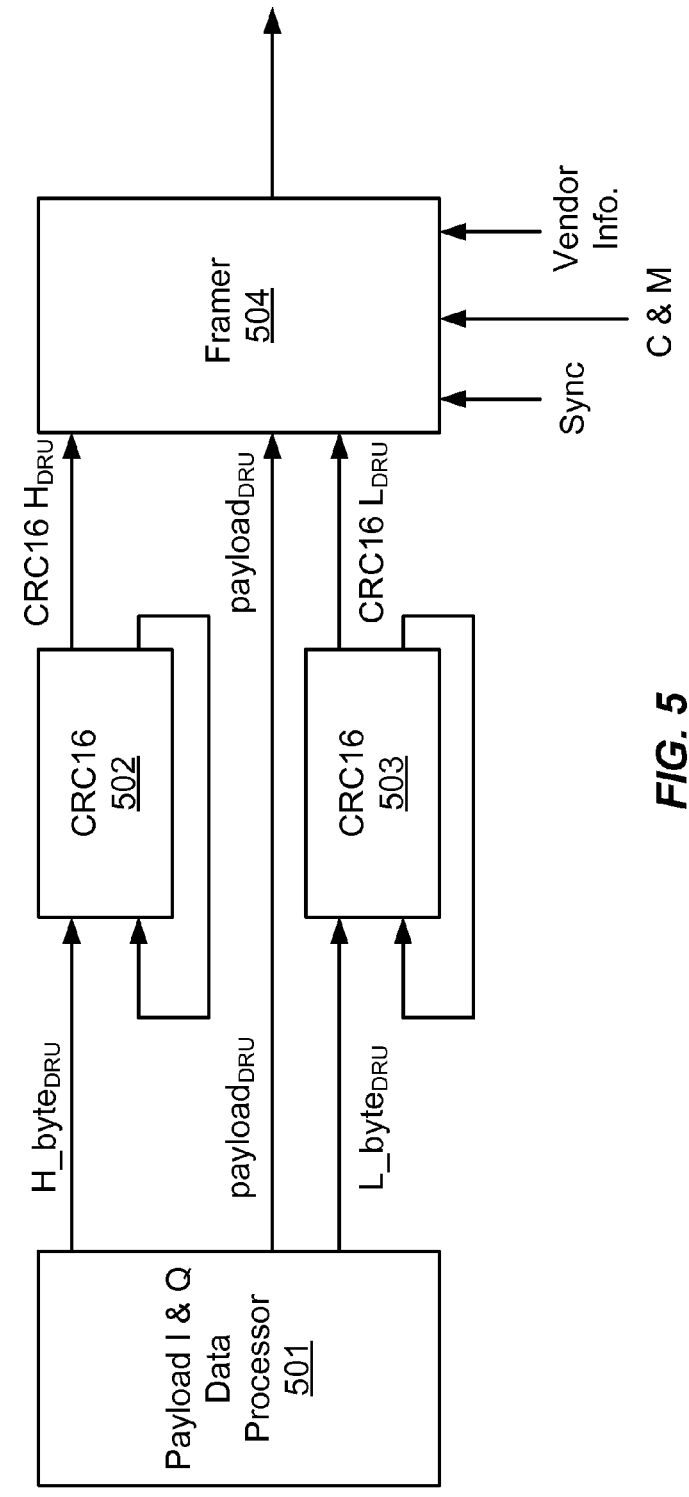
FIG. 4 shows the mapping of the data frame structure used to communicate between the DAU and the DRUs.
FIG. 5 is a block diagram of the Framer structure.

FIG. 4 shows an embodiment of the frame structure for the data that is transported between the DAU and DRUs. The data frame structure includes six portions or elements; the SYNC portion 401, the Vendor specific information portion 402, the control and management (C&M) portion 403, the payload data portion 404, the CRC high byte portion 405 and the CRC low byte portion 406. The SYNC portion 401 is used at the receiver to synchronize the clock of the transported data. The vendor specific information portion 402 is allocated for identifying the individual vendor information, which can include IP addresses associated with information and other information that can be specific to a particular vendor (e.g., a wireless carrier). The control and management portion 403 is used to monitor and control the remote units as well as perform software upgrades. Network control information and performance monitoring along with control signals can be transmitted in the C&M portion 403. The payload I/Q data portion 404 includes the cellular baseband data from the BTS 108 or from the RF antenna port 320. The payload included in this portion is eventually amplified by the amplifier 318 illustrated in FIG. 3. CRC16H 405 and CRC16L 406 are the cyclic redundancy checks that are generated from the payload I/Q data before transport over the fiber. Although CRC-16 is utilized in this figure, this particular CRC is not required by the present invention and other CRC codes can be utilized, including, without limitation, CRC-8, CRC-32, CRC-64, and the like. Moreover, although CRC codes are discussed herein, the present invention is not limited to these particular error corrections codes and other suitable error corrections codes can be utilized by embodiments of the present invention.

FIG. 5 shows a block diagram of the CRC16H 502 and CRC16L 503 data construction from the payload I/Q data 501. Thus, FIG. 5 illustrates how the portions of the data frame structure shown in FIG. 4 is generated. The processing illustrated in FIG. 5 occurs at the DAU. Referring to the inputs to the Framer 504, SYNC 401, C&M 402, and Vendor Specific Information 403 are provided as inputs to the Framer 504. The payload data (i.e., the raw I & Q data) is passed through the I & Q Data Processor 501 on the bus payload$_{DAU}$. Additionally, the payload data is split into a high side byte and a low side byte by the Payload I & Q Data Processor 501. Each of the high side byte (H-byte$_{DAU}$) and the low side byte (L-byte$_{DAU}$) are sent to a distinct CRC16 cyclic redundancy check generator, CRC16 502 and CRC16 503, respectively. The resultant CRC16 codes (CRC16 H$_{DAU}$ and CRC16 L$_{DAU}$) are then packaged by Framer 504 along with the payload data, SYNC, Vendor Specific Information, and C&M data.

Although embodiments of the present invention utilize the high byte and the low byte from the payload data, this is not required by the present invention and other portions of the payload can be utilized to generate the CRC data. Moreover, although a high byte and a low byte are illustrated in FIG. 5, the present invention is not limited to the use of a single byte for the high byte or the low byte and multiple bytes of data can be utilized for the high and low "byte" portions extracted from the payload.

Figure 6:
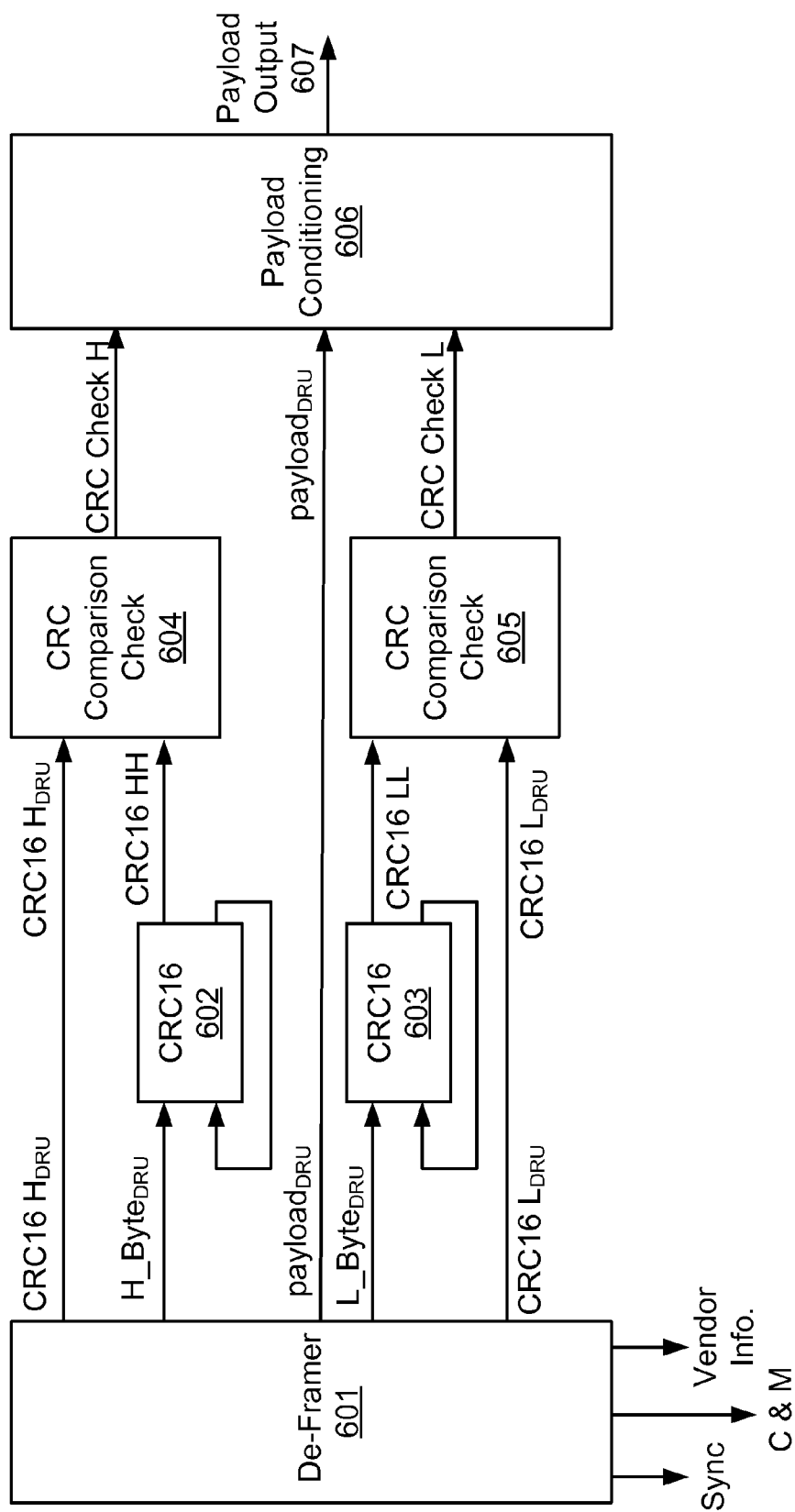
FIG. 6 is a block diagram of the De-Framer along with the Cyclic Redundancy Check (CRC) code comparison at the DRU.

FIG. 6 is a block diagram of the payload conditioning system. The payload conditioning processes illustrated in FIG. 6 are performed at the DRU. Referring to FIG. 3, data is received at the DRU over fiber 300 as an optical signal. Accordingly, processing is done at the DRU to determine if errors are present in the optical data. The payload conditioning system includes a De-Framer 601 that separates the payload I/Q data from the CRC16H and CRC16L data. As illustrated in FIG. 6, the De-Framer 601 generates the data fields discussed in relation to FIG. 4: SYNC, Vendor Specific Information, C & M, as well as payload I & Q data (payload$_{DRU}$). Additionally, the De-Framer 601 generates the CRC16 H$_{DRU}$ code and the CRC16 L$_{DRU}$ code. Referring to FIG. 5, in the absence of errors, the CRC16 H$_{DAU}$ code and the CRC16 L$_{DAU}$ code provided to the Framer 504 are thus generated by the De-Framer 601 as CRC16 H$_{DRU}$ and CRC16 L$_{DRU}$.

In addition, the De-Framer 601 uses the payload I & Q data (payload$_{DRU}$) received at the DRU and generates a high side byte (H-byte$_{DRU}$) and a low side byte (L-byte$_{DRU}$). Referring to FIG. 5, in the absence of errors, the high side byte (H-byte$_{DAU}$) and the low side byte (L-byte$_{DAU}$) provided to the Framer 504 are thus generated by the De-Framer 601 as high side byte (H-byte$_{DRU}$) and low side byte (L-byte$_{DRU}$).

If an error had occurred during the transportation of the payload I/Q data then the CRC16H 602 and/or CRC16L 603 could be used to detect the error. However, there is a finite possibility that an error may have occurred in the regenerated CRC16H$_{DRU}$ and CRC16L$_{DRU}$ data. Under this condition, the payload I/Q data may be deemed to be correct despite the occurrence of an error. This scenario may give rise to allowing an error in the payload I/Q data to be transmitted to the power amplifier 318. Large fluctuations in the payload I/Q data have the potential of damaging the power amplifier in the DRU.

In order to further reduce the possibility of an error propagating to the power amplifier, a recalculation of the CRC codes is performed on the received payload I/Q data at CRC16H 602 and CRC16L 603. Referring to FIG. 6, CRC16 602 generates a new signal CRC16 HH and CRC16 603 generates a new signal CRC16 LL. A comparison is then performed between the received CRC16 data bytes and the recalculated CRC16 data bytes. The comparison between CRC16 H$_{DRU}$ and CRC16 HH is illustrated at CRC Comparison Check 604 and the comparison between CRC16 L$_{DRU}$ and CRC16 LL is illustrated at CRC Comparison Check 605. These comparisons produce data values CRC Check H and CRC Check L, respectively. If the comparison checks determine that the CRC16 H and CRC16 L values are not corrupted, then the payload can be transmitted at 607. Referring to FIG. 3, output 607 is associated with the output from the Framer/Deframer 304 that is delivered to DUC 306.

On the other hand, if there is a disagreement between the received and recalculated values, then this implies that the payload data is corrupted. In this case, the payload I/Q data is all set to zero in some embodiments. In these embodiments, the payload output at 607 will be a null value. Setting the payload data to zero or other suitable small value insures that no large fluctuations occur in the payload I/Q data when an error is detected.

Figure 7:
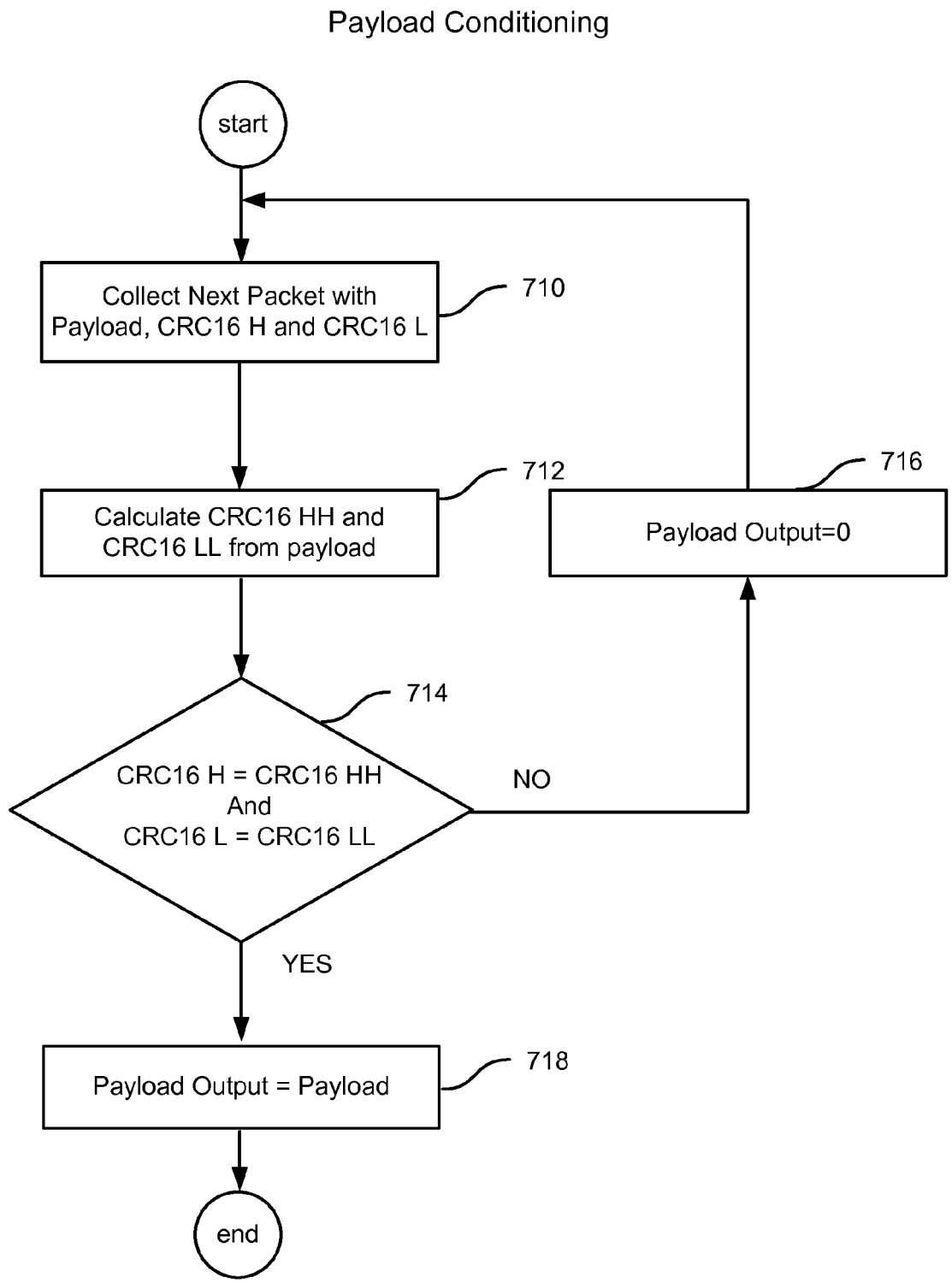
FIG. 7 is a flow chart showing the decision tree and payload setting given an error in the CRC check comparison.

FIG. 7 is a flow chart of a method for detecting for data errors and setting the payload I/Q data to a predetermined value or set of values (e.g., zero) in the event of a detected error according to an embodiment of the present invention. Alternative embodiments such as a gain adjustment to the payload I/Q data can be implemented as opposed to simply zeroing the payload I/Q data. The next packet is collected along with the payload, a first error code, and a second error code (710). In an embodiment, the first error code is a CRC code computed as a function of high bits in the payload (CRC16 H$_{DRU}$) and the second error code is a CRC code computed as a function of low bytes in the payload (CRC16 L$_{DRU}$), but this is not required by embodiments of the present invention.

Using the payload, the first error code, and the second error code, a first recalculated error code and a second recalculated error code are computed (712). The first error code is compared to the first recalculated error code (e.g., CRC16 H$_{DRU}$ and CRC16 HH) and the second error code is compared to the second recalculated error code (e.g., CRC16 L$_{DRU}$ and CRC16 LL) (714). If both sets of values are equal, the payload is passed on as the payload output (718). If there is a discrepancy between the sets of values, which indicates corruption of the payload during transmission, then the payload is modified in order to protect the power amplifier (716). In the embodiment illustrated in FIG. 7, the payload output is set to zero (i.e., the I/Q data is nulled) but this is not required by the present invention. For example, a scaling function could be used to attenuate the payload to a reduced value (e.g., below a predetermined threshold) in comparison to the original signal. The particular threshold can depend on the characteristics of the transmitted payload data and the power amplifier, for example, less than 100% of the original signal strength or amplitude, 50%, 40%, 30%, 20%, 10%, 5%, 1%, values in this range, or the like. It should be noted that in some packet switched systems, loss of payload data occasioned by the power amplifier protection techniques described herein can be remedied by repeat requests that are made by system components as appropriate to the particular application.

Additionally, in addition to abrupt changes in the payload data values, a time average or a moving average of previous payload data values could be stored and then used to modify the payload data when corruption is detected. As will be evident to one of skill in the art, the modification of the payload data can be various ways of altering and/or reducing the amplitude of the I/Q data. As an example, the values can be decreased exponentially over time, averaged with previous data, or the like. For instance, previous data could be retransmitted, with subsequent data reduced in amplitude either instantly, linearly, with an exponential decay (for example, with an exponential decay time constant of a fraction of the length of the payload data), combinations thereof, or the like. Thus, various methods can be used to modify the payload data to produce modified data with an I/Q amplitude less than the previously transmitted payload data.

It should be appreciated that the specific steps illustrated in FIG. 7 provide a particular method of method for detecting for data errors and setting the payload I/Q data to a predetermined value or set of values (e.g., zero) in the event of a detected error according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A system for transporting data in a Distributed Antenna System, the system comprising:
    a plurality of Digital Access Units (DAUs), wherein the plurality of DAUs are coupled and operable to route signals between the plurality of DAUs;
    a plurality of Digital Remote Units (DRUs) coupled to the plurality of DAUs and operable to transport signals between DRUs and DAUs;
    wherein each of the plurality of DRUs includes:
        an error detecting function; and
        an algorithm that alters a payload signal when errors are detected.

2. The system of claim 1 wherein the plurality of DAUs are coupled via at least one of Ethernet cable, Optical Fiber, Microwave Line of Sight Link, Wireless Link, or Satellite Link.

3. The system of claim 1 wherein the plurality of DAUs are coupled to the plurality of DRUs via at least one of Ethernet cable, Optical Fiber, Microwave Line of Sight Link, Wireless Link, or Satellite Link.

4. The system of claim 1 wherein the plurality of DRUs are connected in a daisy chain configuration.

5. The system of claim 1 wherein the plurality of DRUs are connected to at least one of the plurality of DAUs in a star configuration.

6. The system of claim 1 wherein the plurality of DRUs are connected in a loop to at least one of the plurality of DAUs.

7. The system of claim 1 further comprising a plurality of Base Transceiver Stations (BTS), wherein a single DAU port of a DAU of the plurality of DAUs is connected to the plurality of BTS.

8. The system of claim 7 wherein the plurality of DAUs are connected to the plurality of BTSs via at least one of Ethernet cable, Optical Fiber, Microwave Line of Sight Link, Wireless Link, or Satellite Link.

9. The system of claim 1 wherein the algorithm alters the payload signal by nulling the payload signal.

10. The system of claim 1 wherein the algorithm alters the payload signal by adjusting a gain of the payload signal.

11. The system of claim 1 wherein the algorithm alters the payload signal by attenuating the payload signal to a reduced value.

12. A digital remote unit comprising:
    a de-framer providing payload data, a first error code, and a second error code;
    a first error code generation unit coupled to the de-framer and operable to:
        receive at least a first portion of the payload data and the first error code; and
        compute a first error code comparison value;
    a second error code generation unit coupled to the de-framer and operable to:
        receive at least a second portion of the payload data and the second error code; and
        compute a second error code comparison value, wherein the second error code comparison value is computed concurrently with the first error code comparison value;
    a first error code comparison unit coupled to the de-framer and the first error code generation unit and operable to:
        compare the first error code and the first error code comparison value; and
        compute a first modification signal;
    a second error code comparison unit coupled to the de-framer and the second error code generation unit and operable to:
        compare the second error code and the second error code comparison value, wherein the second error code and the second error code comparison value are compared concurrently with comparing the first error code and the first error code comparison value; and
        compute a second modification signal; and
    a payload conditioning unit coupled to the de-framer and operable to modify the payload data in response to at least one of the first modification signal or the second modification signal.

13. The digital remote unit of claim 12 wherein the payload conditioning unit modifies the payload data by nulling the payload data.

14. The digital remote unit of claim 12 wherein the payload conditioning unit modifies the payload data by adjusting a gain of the payload data.

15. The digital remote unit of claim 12 wherein the payload conditioning unit modifies the payload data by attenuating the payload data to a reduced value.

16. The digital remote unit of claim 12 wherein the payload conditioning unit is operable to maintain an average of previous payload data values, and wherein the payload conditioning unit modifies the payload data by adjusting the payload data according to an average of the previous payload data values.

17. The digital remote unit of claim 12 wherein the first portion of the payload data and the second portion of the payload data are the same portion of the payload data.

* * * * *